United States Patent [19]

Stanga et al.

[11] Patent Number: 5,432,206
[45] Date of Patent: Jul. 11, 1995

[54] POLYETHER SILICONE SURFACTANTS FOR THE MANUFACTURE OF URETHANE FOAMS

[75] Inventors: Michael A. Stanga, Midland, Mich.; John H. Frey, Alburtis, Pa.; Robert F. Hoffman, Allentown, Pa.; Robert E. Stevens, Emmaus, Pa.

[73] Assignee: Dow Corning Corporation, Midland, Mich.

[21] Appl. No.: 283,012

[22] Filed: Jul. 29, 1994

[51] Int. Cl.⁶ ............................................. C08J 9/00
[52] U.S. Cl. ................................................... 521/110
[58] Field of Search .............................. 521/110, 155

[56] References Cited

U.S. PATENT DOCUMENTS

| | | | |
|---|---|---|---|
| 3,402,192 | 9/1968 | Haluska | 260/448.2 |
| 3,979,419 | 9/1976 | Prokai et al. | 260/448.8 R |
| 3,979,420 | 9/1976 | Prokai et al. | 260/448.8 R |
| 3,980,688 | 9/1976 | Litteral et al. | 260/448.8 R |
| 4,016,000 | 4/1977 | Prokai et al. | 106/316 |
| 4,018,723 | 4/1977 | Kanner et al. | 260/2.5 AH |
| 4,045,381 | 8/1977 | Prokai et al. | 260/2.5 AH |
| 4,107,068 | 8/1978 | Prokai et al. | 252/182 |
| 4,110,271 | 8/1978 | Kanner et al. | 521/111 |
| 4,242,466 | 12/1980 | Schilling, Jr. et al. | 521/112 |
| 4,331,555 | 5/1982 | Baskent et al. | 252/351 |
| 4,367,291 | 1/1983 | Baskent et al. | 521/112 |
| 4,814,409 | 3/1989 | Blevins, II et al. | 528/25 |
| 4,855,329 | 8/1989 | Blevins, II et al. | 521/112 |
| 4,855,379 | 8/1989 | Budnik et al. | 528/29 |
| 5,145,879 | 9/1992 | Budnik et al. | 521/112 |

*Primary Examiner*—Morton Foelak
*Attorney, Agent, or Firm*—Richard I. Gearhart

[57] ABSTRACT

Silicone surfactants having a siloxane backbone and polyether pendants having average atomic masses of 2250. The surfactants of the invention operate in polyurethane foam compositions to provide stable foams over a range of surfactant concentrations while still producing product foams without splits. Also disclosed and claimed are polyurethane foam compositions which include the surfactants, a method of making polyurethane foam using the surfactants, and polyurethane foam made by the method.

9 Claims, No Drawings

POLYETHER SILICONE SURFACTANTS FOR THE MANUFACTURE OF URETHANE FOAMS

FIELD OF THE INVENTION

This invention relates to silicone surfactants, and more particularly to silicone polyether surfactants having a siloxane backbone and oxyalkylene pendant groups. The surfactants of the present invention are extremely efficient and provide urethane foams without splits, as well as uniform cell structure and size.

BACKGROUND OF THE INVENTION

In polyurethane foam manufacturing, surfactants are needed to stabilize the foam until the product-forming chemical reaction is sufficiently complete so that the foam is self-supporting and does not suffer objectionable collapse.

Silicone polyether surfactants for polyurethane foam manufacture typically are materials having siloxane backbones and polyether pendant groups. They are of two types, nonhydrolyzable and hydrolyzable. The nonhydrolyzable surfactants, in which the polyether pendant groups are attached to the siloxane backbone by Si—C bonds, are generally believed to have high potency but produce "tight" foams with poor breathability. Hydrolyzable surfactants, in which the polyether pendant groups are attached to the siloxane backbone by Si-bonds, are generally believed to have poor potency but offer good processing characteristics, and produce foams with good breathability.

Flexible slabstock polyurethane foam is made by two different processes: the continuous process or the discontinuous process. In the continuous process, the raw materials are fed continuously through a mixer and deposited onto a moving conveyor. Along the conveyor, the foam rises, cures and is cut into blocks of foam. In the discontinuous process, the raw materials are mixed in a stirred tank and poured into a large box.

All foam applications require that the final foam be free of "splits". Splits are ruptures between the foam cell struts which weaken the structural integrity of the foam. Splits are thought to be caused by weakened struts characterized by altered non-uniform cell structure and sizes.

In the continuous process, the surfactant is thought to stabilize the gas nucleation sites, to stabilize the rising foam, and to regulate the cell structure of the foam. Splits are generally though to occur when a foam is under stabilized or over stabilized by either the surfactant or the formation of the polymer network. An effective surfactant used in the continuous process, theoretically stabilizes the foam without causing over stabilization.

Typically, a discontinous process surfactant possesses good emulsification properties because mechanical mixing in a discontinuous process is generally not as good as in the continuous process. It is believed that splits occur in a discontinuous process when the raw materials are not compatibilized properly. We have shown that one source of splits is due to silicone polyether surfactant structure used in the production of the foam. For example, a commercially produced silicone polyether produces splits in discontinuous processes, but not in continuous processes.

Further, the specific polyol chosen for either process can require a surfactant with improved emulsification properties. For example, polyol's made entirely of propylene oxide have a low water solubility which requires better emulsification and therefor it is thought that a surfactant that emulsifies better is needed. Also, as chlorinated solvents are being eliminated, water levels in newer formulations are increasing. Therefore, ethylene oxide/propylene oxide polyol formulations require better emulsifiers as water levels increase.

The silicone polyether surfactants of this invention are particularly useful from the preparation of a type of urethane foam manufactured in a discontinuous process (Box-Foaming) and the continuous process. Less-developed countries use a commerical box foam process. The term "box foam" comes from the shape of the container used in the manufacture. The box is constructed so that the sides are hinged to the bottom so that the final foam can be removed from the mold easily. The foam is then cut into various sizes for a variety of uses. An example of a typical discontinuous commercial Box-Foaming machine is described in *Flexible Polyurethane*, Ron Herrington, Kathy Hock, *Flexible Polyurethane Foams*, copyright 1991, by The Dow Chemical Company. 5.11–5.17 which is hereafter incorporated by reference. Examples of silicone surfactants are described in U.S. Pat. No. 4,147,847. This patent describes certain siloxane-oxyalkylene copolymer silicone surfactants which reduces the occurance of splits in polyurethane compositions. Other surfactants having cyclic siloxane pendant groups as well as polyether pendants, are described in U.S. Pat. No. 4,855,379.

U.S. Pat. No. 3,979,419 to Prokai et al. teaches organosilicone compositions which comprise polysiloxane-polyoxyalkylene copolymers containing monofunctional siloxy units and difunctional siloxy units, an average of between about 2 and about 20 silicon-bonded cyano-bearing ether groups for every two moles of monofunctional units, said cyano-bearing ether groups having the formula, —(O)$_q$R'OR"CN, wherein q is zero or one, R' is bivalent alkylene of 3 to 8 carbon atoms and R" is bivalent alkylene of 2 to 4 carbon atoms, and an average of between about 2 and about 30 silicon-bonded, organic-capped polyoxyalkylene blocks for every two moles of monofunctional units, at least 75 weight percent of the polyoxyalkylene content of said copolymers being constituted of oxyethylene units, said monofunctional units having at least two alkyls bonded to the respective silicon atoms thereof and the difunctional units having at least one alkyl bonded to the respective silicon atoms thereof, the remaining organic group bonded to silicon of the respective monofunctional and difunctional siloxy units being alkyl, said cyano-bearing ether group or said polyoxyalkylene block. The polymers of the present invention, however are structurally different compounds from those described in Prokai, because Prokai teaches cyano-bearing ether groups whereas the present invention does not.

U.S. Pat. No. 3,979,420 to Prokai et al. teaches organosilicone compositions which comprise polysiloxane-polyoxyalkylene copolymers containing monofunctional siloxy units ($M_o$) and, for every two moles of $M_o$, an average of between about 10 and 200 difunctional dialkylsiloxy units, and average of between about 2 and about 100 silicon-bonded cyano-bearing ether groups (Q) having the formula, —(O)$_q$R'OR"CN, wherein q is zero or one, R' is bivalent alkylene of 3 to 8 carbon atoms and R" is bivalent alkylene of 2 to 4 carbon atoms, and an average of between about 2 and about 30 silicon-bonded, organic-capped polyoxyalkylene blocks (E), the polyoxyalkylene content of said copolymers being constituted of between about 20 and about 65 weight percent of oxyethylene units, said $M_o$ units having at least two alkyls bonded to the respective silicon atoms thereof, the remaining organic group of $M_o$ being alkyl, 0 or E, said copolymers also containing difunctional monoalkylsiloxy units the remaining organic group bonded to the respective silicon atoms thereof being Q or E. The polymers of the present invention are structurally different from those taught in Prokai, because Prokai teaches CN bearing compounds and the present invention does not.

U.S. Pat. No. 3,980,688 to Litteral et al teaches polyoxyalkylene polyether admixtures and polysiloxane-polyoxyalkylene block copolymers, a solventless process for producing said copolymers using said admixtures, a process for producing flexible polyether polyurethane foam using said copolymers as foam stabilizers and the foam produced thereby. Litteral, however, teaches cyclic structures as a part of the composition whereas the present invention does not.

U.S. Pat. No. 4,016,000 to Prokai et al teaches organosilicone polymers are provided which comprise polysiloxane-polyoxyalkylene block copolymers wherein the polysiloxane blocks are trialkylsiloxyendblocked and contain reoccurring difunctional dialkylsiloxy monomeric units in combination with reoccurring difunctional cyanoalkyl-alkylsiloxy or cyanoalkoxyalkylsiloxy monomeric units, the mol ratio of the dialkylsiloxy units to the cyano-substituted siloxy units being about 10–200:3–100, and wherein the polysiloxane polyoxyalkylene blocks are joined through an Si—C or an Si—O—C linkage, and from about 20 to about 65 weight percent of the oxyalkylene units of the polyoxyalkylene blocks are constituted of oxyethylene units. The block copolymers of the invention are effective stabilizers of flexible polyether polyolbased polyurethane foams and offer particular advantage in the formation of flame-retarded foams. Also provided is a particular class of cyano-substituted polyalkylsiloxane hydrides which are useful in the preparation of the aforesaid block copolymers. The present invention does not teach the use of cyan-substituted structures.

U.S. Pat. No. 4,018,723 to Kanner et al. teaches organosilicone compositions are provided which comprise polysiloxane-polyoxyalkylene copolymers containing monofunctional siloxy units ($M_o$) and difunctional siloxy units ($D_o$), an average of between about 2 and 100 silicon-bonded morpholino-bearing groups (Q) for every two moles of $M_o$ and an average of between 2 and about 30 silicon-bonded, organic-capped polyoxyalkylene blocks (E) for every two moles of $M_o$, the monofunctional units encompassed by $M_o$ having at least two alkyls bonded to the respective silicon atoms thereof and the difunctional units encompassed by $D_o$ having at least one alkyl bonded to the respective silicon atoms thereof, the remaining organic group bonded to silicon of said monofunctional and difunctional siloxy units being alkyl, 0 or E.

U.S. Pat. No. 4,045,381 to Prokai et al. teaches cyano-modified polysiloxane-polyoxyalkylene block copolymers that contain a trifunctional $RSiO_{3/2}$ siloxy unit, as well as, a process for producing flexible polyether urethane foam wherein said copolymers are employed as the foam stabilizing component. The present invention does not teach cyano-modified structures.

U.S. Pat. No. 4,107,068 to Prokai et al. teaches acrylonitrile-capped polyoxyalkylene compounds; siloxane polymers modified with the corresponding radicals of said compounds; solvent compositions containing said siloxane polymers; a process for producing polyurethane foam using said siloxane polymers as the foam stabilizer; and the foam produced from said process. The present invention does not teach anylonitrile-modified compounds.

U.S. Pat. No. 4,110,271 to Kanner et al. teaches the formation of polyurethane foam including flame-retarded foam is provided employing, as the surfactant component of the foam formulation, a particular class of sulfolanyloxyalkyl-substituted polysiloxane-polyoxyalkylene polymers. The polymers comprise chemically combined monofunctional siloxy units ($M_o$) and difunctional siloxy units ($D_o$) and, for every two moles of $M_o$, an average of from about 2 to about 100 silicon-bonded sulfolanyloxyalkyl groups (Q) and an average of from about 2 to about 30 silicon-bonded polyoxyalkylene blocks (E). The $M_o$ units have at least two alkyls bonded to the respective silicon atoms thereof and the $D_o$ units have at least one alkyl bonded to the respective silicon atoms thereof, the remaining group bonded to silicon of said $M_o$ and $D_o$ units being alkyl, W or E. When the polyol reactant of the foam formulation is a polyether polyol, the polymers contain from 10 to 200 dialkylsiloxy units and from 2 to 100 Q groups, and the polyoxyalkylene content of E is constituted o from 20 to 75 weight percent oxyethlene. When the polyol reactant is a polyester polyol, the polymers contain zero or up to 20 dialkylsiloxy units and from 2 to 20 Q groups, and the polyoxyalkylene content of E is constituted of at least 75 weight percent oxyethylene. The present invention does not teach the us of sulfonanes.

U.S. Pat. No. 4,242,466 to Schilling, Jr. et al. teaches organic ethers including polyethers having two $CH_2=C(R)CH_2$-end groups per molecule wherein R is a monovalent hydrocarbon group are reacted with organohydrosiloxanes under hydrosilation reaction conditions in the presence of a platinum catalyst preferably a neutral platinum catalyst, to form very useful nonhydrolyzable siloxane block copolymers. Novel nonhydrolyzable linear block copolymers substantially free of silicon-bonded hydrogen are obtained with linear dihydropolyorganosiloxane reactants and linear ethers or polyethers.

U.S. Pat. No. 4,331,555 to Baskent et al. teaches a process for manufacturing low density flexible polyester polyurethane foam utilizing as a foam stabilizer selected low molecular weight (e.g., 400 to 1500) organosiloxane compositions containing monomeric units A, B and C wherein A is monofunctional trimethylsiloxy unit [$(CH_3)_3SiO_{\frac{1}{2}}$], B is a difunctional dimethylsiloxy unit [$(CH_3)_2SiO_{2/2}$] and C is a difunctional organomethylsiloxy unit [$R(CH_3)SiO_{2/2}$] where R is a cyano-, ether-, hydroxy-or phenyl-organo modifying moiety, and in which the unit ratio of B to C in each organosiloxane composition is from 1 to 4 inclusive; solutions of such organosiloxane compositions; and the foams derived from such process. The surfactants taught in Baskent, however, have a D/D' ratio of 6.7 to 13, whereas the D/D' ratio of the present invention is 14–18.

U.S. Pat. No. 4,367,291 to Baskent et al. teaches combustibility properties of flexible polyurethane foams made with flame retardant additives are increased by incorporating into the foam-forming reaction mixture a combination of certain flame retardant surfactants and certain low molecular weight polyols. The surfactants taught therein teach a D/D' ratio much smaller than that of the present invention.

U.S. Pat. Nos. 4,814,409 and 4,855,329 to Blevins, II et al. teaches the present invention provides certain polysiloxanepolyoxyalkylene compositions and their use as stabilizers in the manufacture of polyether polyurethane foam. More particularly, the present invention provides such compositions, which have a polysiloxane chain substituted with at least two types of polyoxyalkylene polymers as pendants from the silicon atoms of the polysiloxane.

The polysiloxane chain is linear or branched and can have average molecular weights of up to 30,000 or higher, excluding the weight of the polyoxyalkylene polymers.

The distinctive feature of these compositions is the specific selection of polyoxyalkylene polymers. Preferably the polyoxyalkylene polymer pendants are provided as at least three different polyoxyalkylene polymers. One of these polyoxyalkylene polymers is composed of only oxypropylene units. This polyoxypropylene has an average molecular weight from about 130 to about 1200 excluding link and endcap. The other polyoxyalkylene polymers are composed of both oxyethylene and oxypropylene units.

The present invention differs structurally from the two previously cited Blevins patents because the present invention has only a single type of pendant.

U.S. Pat. No. 4,855,379 to Budnik et al. teaches novel siloxane-polyether polymers are provided containing cyclic siloxanes which are useful in silicone surfactants for foam polyurethane foam applications. The novel polymers are prepared by reacting a polyhydridosiloxane polymer with a cyclic polysiloxane containing a vinyl group and with an allyl started polyoxyalkylene polymer in the presence of a platinum catalyst. The resulting polymeric products are highly potent and impart flat breathability profiles to foams when used as surfactants in their preparation.

U.S. Pat. No. 5,145,879 to Budnik et al. teaches silicone surfactants having a siloxane backbone and a mixture of high and low atomic mass oxyalkylene pendant groups, these polyether pendants having average atom mass is of 1500–6000 and 300–750 respectively. The surfactants of the invention operate in polyurethane foam compositions to provide stable foams over a range of surfactant concentrations while still producing product foams having relatively constant breathability. Also disclosed and claimed are polyurethane foam compositions which include the surfactants, a method of making polyurethane foam using the surfactants, and polyurethane foam made by the method. The present invention teaches a composition having only a single pendant group.

It would be desirable to have nonhydrolyzable silicone surfactants which have high efficiency, and offer good processing characteristics, such as good emulsification of TDI/H$_2$O, good water solubility without providing foam splits. Such surfactants are the subject of the present application.

SUMMARY

The present invention provides nonhydrolyzable silicone surfactants which offer excellent efficiency and desirable processing characteristics such as good emulsification of TDI/H$_2$O, good water solubility without providing foam splits. Moreover, polyurethane foams produced with silicone surfactant of the present invention showed better foam heights, and lower shrink and sigh rates while maintaining good air flow, than foams produced with other surfactants.

The surfactants of this invention are compositions of matter having the generalized average formula $$MD_xD'_yM$$

wherein

M represents $(CH_3)_3SiO_{\frac{1}{2}}$ or $R(CH_3)_2SiO_{\frac{1}{2}}$;
D represents $(CH_3)_2SiO_{2/2}$;
D' represents $(CH_3)(R)SiO_{2/2}$; and
x+y is between 94 and 150, and the ratio x/y is from 13.5 to 18 inclusive.

In the above formulae for M and D', R is a polyether-containing substituent derived from a $C_nH_{2n}$-started polyether and is selected from the group consisting of:

(1) —$C_nH_{2n}O(C_2H_4O)_a(C_3H_6O)_bR''$ moieties having average atomic masses in the range 1500 to 3000 and wherein n is 3–4;

"a" is a number such that ethylene oxide residues constitute 30–55% weight of the alkylene oxide residues of the polyether;

"b" is a number such that propylene oxide residues constitute 45–70% by weight of the alkylene oxide residues of the polyether; and R'' represents H, an alkyl group of 1–4 carbon atoms, or —C(O)CH$_3$.

The invention also relates to polyurethane foam compositions comprising:

(a) a polyol;
(b) an organic polydiisocyanate;
(c) at least one catalyst for production of polyurethane foam;
(d) a blowing agent; and
(e) a siloxane-oxyalkylene copolymer surfactant as defined above.

The invention further relates to a method of preparing a polyurethane foam by reacting a polyol, an organic diisocyanate in the presence of at least one catalyst for production of polyurethane foam, a blowing agent, and a siloxane-oxyalkylene copolymer surfactant as defined above.

The invention also relates to polyurethane foam produced using the above-described method.

DETAILED DESCRIPTION OF THE INVENTION

The surfactants of this invention are compositions of matter
having the generalized average formula $$MD_xD'_yM$$

wherein

M represents $(CH_3)_3SiO_{\frac{1}{2}}$ or $R(CH_3)_2SiO_{\frac{1}{2}}$;
D represents $(CH_3)_2SiO_{2/2}$;
D' represents $(CH_3)(R)SiO_{2/2}$; and
x+y is between 94 and 100, and the ratio x/y is from 13.5 to 18 inclusive.

In the above formulae for M and D', R is a polyether-containing substituent derived from a $C_nH_{2n}$-started polyether and is selected from the group consisting of:

(1) —$C_nH_{2n}O(C_2H_4O)_a(C_3H_6O)_bR''$ moieties having average atomic masses in the range 1500 to 3000 and wherein n is 3–4;

"a" is a number such that ethylene oxide residues constitute 30-55% by weight of the alkylene oxide residues of the polyether;

"b" is a number such that propylene oxide residues constitute 45-70% by weight of the alkylene oxide residues of the polyether; and R" represents H, an alkyl group of 1-4 carbon atoms, or —C(O)CH$_3$.

Within the broad range of compounds of the invention as defined above are a number of preferred materials. The polyether-containing substituents R having average atomic masses in the range 1500-3000 are preferably —C$_3$H$_6$O(C$_2$H$_4$O)$_a$(C$_3$H$_6$O)$_b$R" moieties containing approximately 40% by weight of ethylene oxide residues and having average atomic masses of approximately 2250. R" is preferably —C(O)CH$_3$.

Procedures for synthesizing nonhydrolyzable silicone surfactants having polyalkylene oxide pendant groups are well known. Representative disclosures are provided in U.S. Pat. Nos. 4,147,847 and 4,855,379, which are hereby incorporated by reference.

Typically, the surfactants of the invention are prepared by causing a polyhydridosiloxane of generalized average formula M*D$_x$D"$_y$M* to react with an appropriately chosen blend of allyloxyalkylene polyethers in the presence of a hydrosilation catalyst such as chloroplatinic acid. In the formula for the polyhydridosiloxane, M* is (CH$_3$)(H)SiO$_{\frac{1}{2}}$ or (CH$_3$)$_3$SiO$_{\frac{1}{2}}$, D is as defined above, and D" represents (CH$_3$)(H)SiO$_{2/2}$. The allyl oxyalkylene polyethers are polyethers having a terminal vinyl group, and containing multiple units derived from ethylene oxide, propylene oxide, or both. The reagents are mixed, generally in a solvent such as toluene or isopropanol (2-propanol), heated to about 70°-85° C., then the catalyst is added, a temperature rise of about 10°-15° C. is observed, and the mixture is finally sampled and analyzed for SiH groups by adding an alcohol and base and measuring evolved hydrogen. If a volatile solvent was used, this is removed under vacuum.

The polyhydridosiloxanes of generalized average formula M*D$_x$D"$_y$M* are prepared in the manner known to the art. For the case in which M* is (CH$_3$)$_3$SiO$_{\frac{1}{2}}$, an alkyldisiloxane such as hexamethyldisiloxane, a polyhydridosiloxane polymer, and an alkyl cyclosiloxane such as octamethylcyclotetrasiloxane are reacted in the presence of a strong acid such as sulfuric acid. For the case in which M* is (H)(CH$_3$)$_2$SiO$_{\frac{1}{2}}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The allyl oxyalkylene polyethers, also referred to as polyethers, are likewise prepared in the manner known to the art. An allyl alcohol, optionally bearing a substituent on the 1 or 2-position, is combined with ethylene oxide, propylene oxide, or both, in the presence of an acid or a base, to yield the desired polyether with a terminal hydroxyl group. This is typically capped by further reaction with an alkylating or acylating agent such as a methyl halide or acetic anhydride, respectively, to obtain an alkoxy or acetyl endgroup. Other end caps may of course be employed, including alkoxy groups or alkyl or aryl groups.

In addition, the silicone surfactants of the present invention may be diluted with a variety of diluents. A preferred diluent is dipropylene glycol. The diluted surfactant is at a concentration that yields optimal performance at a normal use level. This concentration is dependent on the formulation, application, and the capacity or range of available metering devices and the viscosity of the final product.

The surfactants of the invention are employed in the manufacture of polyurethane foam in the manner known to the art. In producing the polyurethane foams using the surfactants of this invention, one or more polyols, preferably polyether polyols, are employed for reaction with a polyisocyanate to provide the urethane linkage. Such polyols have an average typically 2.1 to 3.5 hydroxyl groups per molecule. Illustrative of suitable polyols as a component of the polyurethane foam composition are the polyalkylene ether and polyester polyols. The preferred polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as reacting caprolactone with propylene glycol.

In addition to the polyether and polyester polyols, the masterbatches, or premix compositions, may contain a polymer polyol. Polymer polyols are used in polyurethane foam to increase the foam's resistance to deformation i.e. to increase the load-bearing properties of the foam. Currently, two different types of polymer polyols are used to achieve load-bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20-80% of the polyol portion of the masterbatch.

The polyurethane foam products are prepared using suitable organic polyisocyanates well know in the art including, for example, hexamethylene diisocyanate, phenylene diisocyanate, toluene diisocyanate (TDI) and 4,4'-diphenylmethane diisocyanate (MDI). Especially suitable are the 2,4- and 2,6- TDIs individually or together as their commercially available mixtures. Other suitable isocyanates are mixtures of diisocyanates known commercially as "crude MDI", also know as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols.

Other typical agents found in the polyurethane foam formulations include crosslinkers such as ethylene glycol, butanediol, diethanolamine, diisopropanolamine, triethanolamine and/or tripropanolamine; blowing agents such as water, methylene chloride, trichlorofluoromethane and other CFC's and HCFC's; and tertiary amine and organotin urethane catalysts well known in the polyurethane foam art such as triethylenediamine, bis(dimehtylaminoethyl) ether and stannous octoate.

Other additives may of course be employed to impart specific properties to the foam. Examples are materials such as flame retardants, colorants and hardness.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the surfactant to the reaction mixture as a premixture with one or more of the blowing agents, polyol, and catalyst components.

It is to be understood that the relative amounts of the various components of the foam formulation are not narrowly critical. The polyol and polyisocyanate are present in the foam-producing formulation in a major amount. The relative amounts of these two components in the mixture are well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an amount sufficient to impart the properties desired and to stabilize the reacting foam.

In a typical preparation, the polyol, surfactant, amine catalyst, and blowing agent are mixed together, then stannous octoate is added with stirring, and finally toluene diisocyanate is mixed in and the composition is allowed to foam and polymerize.

The polyurethanes produced in accordance with the present invention can be used in the same areas as conventional polyurethanes. For example, the foams of the present invention can be used with advantage in the manufacture of textile interliners, cushions, mattresses, padding, carpet underlay, packaging, gaskets, sealers, thermal insulators and the like.

EXAMPLES

In the examples which follow, all reactions involving the manipulation of organometallic compounds were performed in an inert atmosphere. Commercial reagents were used without additional purification. All glassware was washed successively with KOH/ethanol, water, dilute HCl and water, then oven-dried before use. The foams in which the surfactants of the present invention were tested were made in accordance with the following procedures on the following formulation:

| | |
|---|---|
| Methylene Chloride | 15.0 phpp |
| Dabco TL amine | 0.14 phpp |
| Surfactant | 1.5 phpp |
| V230-056 polyol (Dow) | 100.0 phpp |
| H$_2$O | 6.0 phpp |
| Dabco T16 | 0.6 phpp |
| TDI | 80.0 phpp | phpp = parts hundred parts polyol

1) For each foam a polyethylene liner was prepared and inserted into a corrugated box having dimensions 14×14×14 inches.
2) A premix was prepared for each series of foams. The premix contained polyol, water and amine catalyst.
3) Premix was weighed into a paper cup and silicone surfactant was added.
4) In a separate plastic beaker, TDI (toluene diisocyanate) was weighed and methylene chloride added to the TDI.
5) Dabco T16 (available from Air Products and Chemicals, Inc. in Allentown, Pa.) was added to the resin cup and mixed for 10 seconds with the electric mixer at 6500 rpm. Dabco T16 is a 50% dilution of stannous octoate.
6) The contents of the TDI/methylene chloride beaker were poured into the resin cup and immediately mixed for 6 seconds.
7) A stopwatch was started when the electric mixer started to mix the contents of the cup.
8) The mixture was poured into the box keeping the lip of the cup as close to the bottom of the box as possible to avoid splashing.
9) The remaining material in the cup was weighed.
10) Cream time and blow off time were measured. Height were measured at full rise, after 5 min and after 24 hours.
11) After the 5 minute foam height was taken, the foams were given a final cure in a 180° F. oven for at least 20 minutes and then allowed to cool in a ventilated cabinet over night before cutting.
12) A two inch cross section of the foam was cut vertically in the foam and in the center of the foam.
13) One of the remaining halves of the foam was cut horizontally to provide one inch thick bottom, middle and top sample specimens. The bottom specimen was cut 2 inches above the bottom of the foam and each specimen layer was separated by a two inch space.

Example I

Silicone surfactants were produced in accordance with the methods earlier described. The surfactants were used in the formulation described above to produce polyurethane foams. The cured foams were examined to determine if the surfactants produced any splits. The results are shown in Table 1.

TABLE 1

| Foam Splits as a Function of X/Y | |
|---|---|
| X/Y | Splits |
| 12.9 | Yes |
| 13.3 | Some Splits |
| 14.0 | None |
| 17.4 | None |
| 17.8 | None |

The data in the foregoing table shows that the polyethers of the present invention do not produce foam with splits where the ratio of X/Y groups is greater than 13.3. In polyethers having an X/Y ratio of 13.3 or less, splits occur in the resulting foams.

Example II

Polyurethane foams were made in accordance with the procedures in Example I using the following silicone surfactants: Surfactant A is a silicone surfactant having a degree of polymerization ("DP") of 220, a target D to D' ratio of 11, a ratio of ethylene oxide to propylene oxide groups ("EO/PO") of 24/24, and a $C(O)CH_3$ group terminating the EO/PO pendant. The surfactant was diluted 50% in Dowanal EPH, (available from the Dow Chemical Corporation, Midland, Mich.)

Surfactant B is a silicone surfactant of the present invention having a DP of 99, a target D to D' ratio of 14, an EO/PO ratio of 24/24, and a $C(O)CH_3$ group terminating the EO/PO pendant. The surfactant was diluted 50% in Dowanal EPH.

Surfactant C is a silicone surfactant having a DP of 77, a target D to D' ratio of 14, an EO/PO ratio of 24/24 and a $C(O)CH_3$ group terminating the EO/PO pendant. The surfactant was diluted 50% in Dowanal EPH.

The performance of the foams using each of the surfactants is described in Table 2. In Table 2, the terms therein have the following meanings.

"Max. Ht." is the maximum height obtained during the rise of the foam.

"Max.+5" is the maximum height of the foam after 5 minutes from the initial mixing of the foam components.

"Max+24" is the maximum height of the foam after 24 hours from the initial mixing of the foam components.

$$\text{"\% Sigh"} = 100 \times \frac{(\text{Max Ht}) - (\text{Max} + 5)}{\text{Max Ht}} = \% \text{ sigh back}$$

$$\text{"\% Shrink"} = 100 \times \frac{(\text{Max} + 5) - (\text{Max} + 24)}{(\text{Max} + 5)} = \% \text{ shrinkage}$$

"Airflow"=Average airflow in cubic feet per minute through a foam sample having dimensions $2 \times 2 \times 1$ inch. The average airflow is taken from the bottom, middle and top samples from a block of foam.

"D-Top"=density of top foam specimen from a block of foam in $kg/m^3$.

"D-Mid"=density of middle foam specimen from a block of foam in $kg/m^3$.

"D-Bot"=density of bottom foam specimen from a block of foam in $kg/m^3$.

TABLE 2

| Silicone | MAX HT | mh + 5 | mh + 24 | MAX HT | % SIGH |
|---|---|---|---|---|---|
| A | 430.24 | 413.11 | 406.25 | 448.51 | 3.9 |
| B | 434.29 | 411.20 | 406.15 | 451.74 | 5.3 |
| C | 431.81 | 408.97 | 401.59 | 450.47 | 5.2 |

| | % SHRINK | A-top | A-mid | A-bot | AIRFLOW |
|---|---|---|---|---|---|
| A | 1.66 | 2.92 | 2.16 | 1.94 | 2.34 |
| B | 1.23 | 3.96 | 3.09 | 2.61 | 3.22 |
| C | 1.80 | 2.39 | 2.06 | 1.63 | 2.03 |

| | D-top | D-mid | D-bot | | |
|---|---|---|---|---|---|
| A | 12.11 | 12.58 | 12.51 | | |
| B | 11.48 | 12.48 | 11.94 | | |
| C | 12.06 | 12.21 | 12.51 | | |

Surfactant B produces a foam having acceptable overall characteristics, and produces superior Air flow and Foam hts compared to the other tested surfactants, A and C.

We claim:

1. A composition of matter having the average formula $$MD_xD'_yM$$

wherein

M represents $(CH_3)_3SiO_{\frac{1}{2}}$ or $R(CH_3)_2SiO_{\frac{1}{2}}$;

D represents $(CH_3)_2SiO_{2/2}$;

D' represents $(CH_3)(R)SiO_{2/2}$;

x+y is between 94 and 150 and the ratio x/y is from 13.5 to 18;

wherein in the above formula for M and D', R is a polyether-containing substituent derived from a $C_nH_{2n}$-initiated polyether having $-C_nH_{2n}O(C_2H_4O)_a(C_3H_6O)_bR''$ moieties having average atomic masses in the range 1500–3000 and wherein n is 3–4;

a is a number such that ethylene oxide residues constitute 30–55% by weight of the polyether;

b is a number such that propylene oxide residues constitute 45–70% by weight of the polyether; and R'' represents H, an alkyl group of 1-4 carbon atoms, or $-C(O)CH_3$.

2. The composition of claim 1 wherein said composition is mixed with a diluent.

3. The composition of claim 2 wherein the diluent is dipropylene glycol.

4. The composition of claim 2 wherein x is from 70 to 141 and y is from 4 to 1, with the proviso that x+y is between 94 and 150.

5. The composition of claim 4 wherein x is about 82 and y is about 6, with the proviso that x+y is between 94 and 150.

6. The composition of claim 1 wherein the polyether-containing substituents R have average atomic masses of approximately 2250.

7. In a polyurethane foam composition comprising: a polyol, an organic polyisocyanate, at least one urethane catalyst, a blowing agent, a siloxane-oxyalkylene copolymer cell stabilizer, the improvement which comprises:

a siloxane-oxyalkylene copolymer having the generalized average formula $$MD_xD'_yM$$

wherein

M represents $(CH_3)_3SiO_{\frac{1}{2}}$ or $R(CH_3)_2SiO_{\frac{1}{2}}$;

D represents $(CH_3)_2SiO_{2/2}$;

D' represents $(CH_3)(R)SiO_{2/2}$;

x+y is between 94–150, and the ratio x/y is from 13.5 to 18 inclusive; wherein in the above formula for M and D', R is a polyether-containing substituent derived from a $C_nH_{2n}$-initiated polyether having $-C_nH_{2n}O(C_2H_4O)_a(C_3H_6O)_bR''$ moieties having average atomic masses in the range 1500–3000 and wherein n is 3–4;

a is a number such that ethylene oxide residues constitute 30–55% by weight of the polyether;

b is a number such that propylene oxide residues constitute 45–70% by weight of the polyether; and R'' represents H, an alkyl group of 1-4 carbon atoms, or $-C(O)CH_3$.

8. In a method of preparing polyurethane foam, which comprises reacting a polyol and an organic polyisocyanate in the presence of at least one urethane catalyst, a blowing agent and a siloxane-oxyalkylene copolymer cell stabilizer, the improvement which comprises:

employing as the cell stabilizer a siloxane-oxyalkylene copolymer having the generalized average formula $MD_xD'_yM$ $$MD_xD'_yM$$

wherein

M represents $(CH_3)_3SiO_{\frac{1}{2}}$ or $R(CH_3)_2SiO_{\frac{1}{2}}$;
D represents $(CH_3)_2SiO_{2/2}$;
D' represents $(CH_3)(R)SiO_{2/2}$;

x+y is between 94–150, and the ratio x/y is from 13.5 to 18 inclusive; wherein the above formula for M and D, R is a polyether-containing substituent derived from a $C_nH_{2n}$-initiated polyether having moieties having average atomic masses in the range 1500–3000 and wherein n is 3–4;

a is a number such that ethylene oxide residues constitute 30–55% by weight of the polyether;

b is a number such that propylene oxide residues constitute 45–70% by weight of the polyether; and R'' represents H, an alkyl group of 1–4 carbon atoms, or —$C(O)CH_3$.

9. Polyurethane foam prepared by the process of claim 8.

* * * * *